United States Patent [19]
Ishii et al.

[11] Patent Number: 5,245,599
[45] Date of Patent: Sep. 14, 1993

[54] DISC PLAYER USING A SERVO LOOP WITH A VARIABLE TRANSFER FUNCTION

[75] Inventors: Hidehiro Ishii; Noriyoshi Takeya; Chiharu Miura; Tatsuya Fukuda, all of Tokorozawa, Japan

[73] Assignee: Pioneer Electronic Corp., Tokyo, Japan

[21] Appl. No.: 416,790

[22] Filed: Oct. 5, 1989

[30] Foreign Application Priority Data

Oct. 5, 1988 [JP] Japan .................. 63-251224
Oct. 5, 1988 [JP] Japan .................. 63-251225

[51] Int. Cl.⁵ ........................................ G11B 7/095
[52] U.S. Cl. ........................ 369/44.32; 369/44.36; 369/54; 369/58
[58] Field of Search ............ 369/44.25, 44.29, 44.32, 369/44.35, 44.36, 54, 58; 358/907

[56] References Cited

U.S. PATENT DOCUMENTS

| | | | |
|---|---|---|---|
| 4,580,255 | 4/1986 | Inoue et al. | 369/44.29 |
| 4,587,644 | 5/1986 | Fujiie | 369/44.32 X |
| 4,700,334 | 10/1987 | Shinkai | 369/44.29 X |
| 4,701,603 | 10/1987 | Dakin et al. | 369/44.29 X |
| 4,703,468 | 10/1987 | Baba et al. | 369/44.35 X |
| 4,722,079 | 1/1988 | Matsumoto . | |
| 4,736,354 | 4/1988 | Yoshio | 369/44.35 X |
| 5,023,854 | 6/1991 | Satoh et al. | 369/44.29 X |
| 5,025,434 | 6/1991 | Tateishi et al. | 369/44.29 X |

FOREIGN PATENT DOCUMENTS

| | | |
|---|---|---|
| 0160095 | 11/1985 | European Pat. Off. . |
| 0183435 | 6/1986 | European Pat. Off. . |
| 0207374 | 1/1987 | European Pat. Off. . |

Primary Examiner—W. R. Young
Attorney, Agent, or Firm—Foley & Lardner

[57] ABSTRACT

A disc playing apparatus having a tracking servo loop and a focus servo loop is configured such that a transfer function of at least one of the servo loops is adjustable. Disc defect detection signals are generated in response to a change in a low frequency component and a high frequency component of a read signal output from the pickup, and the transfer function of at least one of the tracking servo loop and the focus servo loop is adjusted in response to the disc defect detection signals. According to another feature of the invention, the transfer function of at least one of the tracking servo loop and the focus servo loop is gradually changed each time an erroneous jumping movement of the information reading light spot is detected by information contained in the read signal output by the pickup.

5 Claims, 7 Drawing Sheets

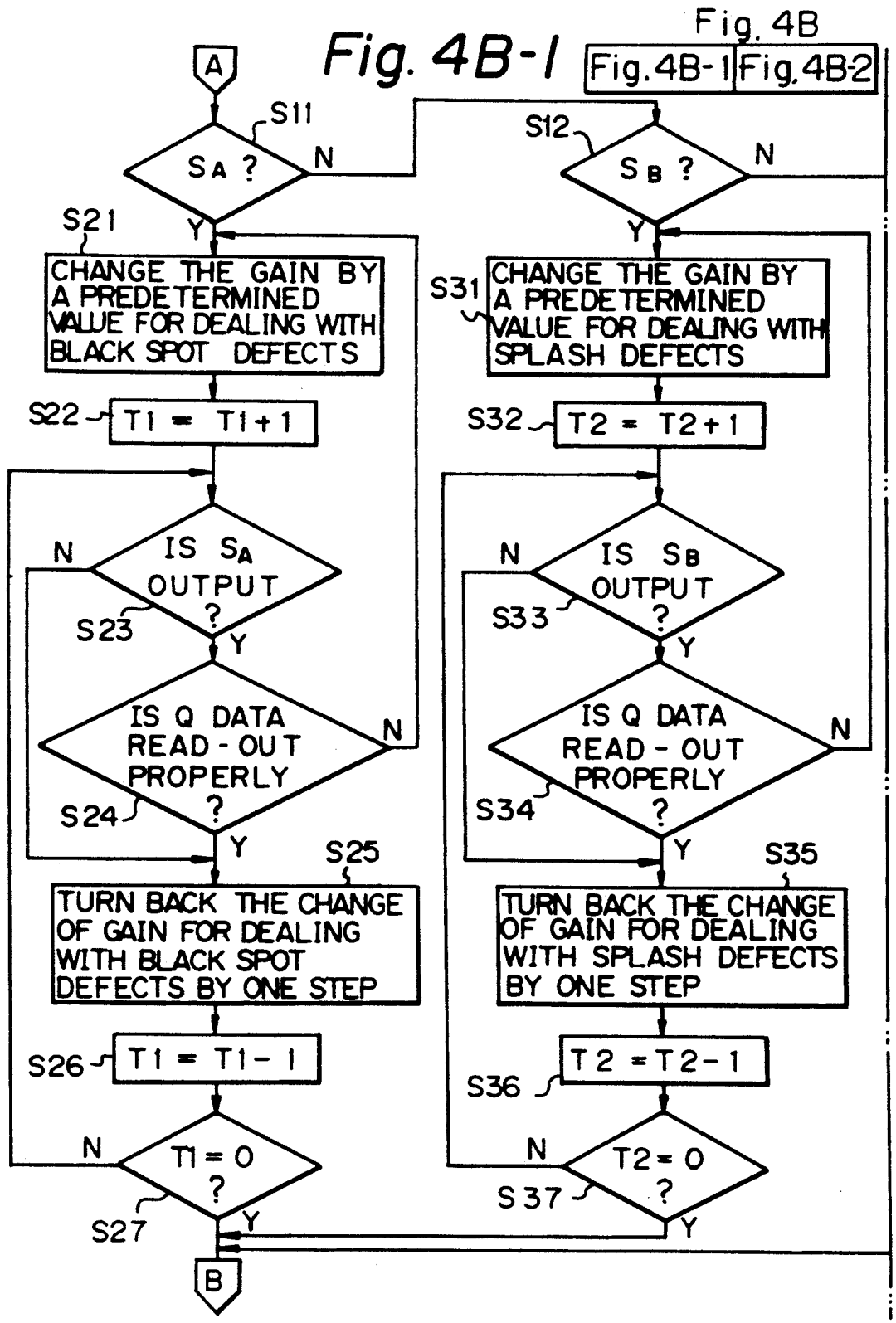

DISC PLAYER USING A SERVO LOOP WITH A VARIABLE TRANSFER FUNCTION

BACKGROUND OF THE INVENTION

1. Field of the Invention

The present invention relates to a disc player for playing a recording disc such as a digital audio disc or a video disc.

2. Description of Background Information

Disc players are structured such that an optical beam is used to trace a recording tract constituted by depressions called pits formed in the recording surface of the disc, and a recording signal is read-out by detecting the light from the recording surface of the disc. For such operations, it is necessary to use a focus servo system for converging the light beam onto the surface of the disc to form a light spot for reading information (information reading point) and a tracking servo system for moving the information reading point so that it follows the recording track accurately.

For the focus servo system, systems according to a so-called astigmatic method are known. Such systems are arranged such that the light beam is converged, by using a cylindrical lens for example, as a focal line in the horizontal direction at one of two separate points on the light path of the light beam. The light beam is also converged as a focal line in the vertical direction at the other of the two points. A light sensor of a quadrant type is disposed at a middle position of the two points, to generate an error signal.

For the tracking servo system, systems according to a so-called three-beam method are known. Such systems are arranged such that three beams including a main beam for reading information and two sub-beams for detecting tracking errors disposed on both sides of the main beam are prepared and arranged so that a line passing through the center of the three beams forms a predetermined off-set angle with respect to the direction of the track, and an error signal is generated from a difference between the amount of the two sub-beams reflected by the recording surface of the disc.

With this type of tracking servo systems, if there is a defect called a splash defect such as a flaw of the aluminium layer evaporated on the recording pits, the defect is read by the sub-beam, and a pulse-like noise will be generated in the tracking error signal. In such an event, the noise in the tracking error signal in turn causes a fault called a track jumping by which the information reading light spot erroneously jumps to another track. In the focus servo systems, if there is a defect called black spot defect such as a stain on the recording surface of the disc, a noise will be generated in the focus error signal. In such an event, the control operation of the focus servo system is disturbed, and the sub-beams of the tracking servo system are adversely affected by such a disturbance. This also will result in the track jumping fault.

As described above, faults of the disc do not occur uniformly, and it has been very difficult to prevent faults caused by a defect of the disc such as the track jumping fault.

More specifically, in order to cope with faults cause by the defect of the disc it is effective to lower the loop gain of the servo loop so as to reduce the influence of noises. However if a vibration is applied to the player from outside, the relative distance between the disc and the objective lens is varied by the vibration, and this also will cause the track jumping fault. For the track jumping fault caused by external vibrations, it is effective to increase the loop gain of the servo loop, so as to improve the response of the servo loop against the change in the relative position. It then follows that, a measure to counter the defect of the disc will deteriorate the stability of the player against vibrations. Thus it has been very difficult to prevent faults by the defect of the disc and faults by external vibrations at the same time.

OBJECT AND SUMMARY OF THE INVENTION

The present invention is based on the recognition of the above-described points. An object of the present invention is to provide a disc player which is capable of preventing faults caused by defects in the disc. Another object of the present invention is to provide a disc player which is capable of preventing faults caused by the defects in the disc as well as faults caused by external vibrations.

A disc player according to the present invention is configured to generate a first defect detection signal when an instantaneous level of a low frequency component of the reading signal of the pickup has dropped below a first predetermined value, and to generate a second defect detection signal when an instantaneous level of a high frequency component of the error signal of the tracking servo loop has risen above a second predetermined value. The transfer function of at least one of the tracking servo loop and the focus servo loop is adjusted in response to the first and second defect detection signals respectively.

According to another aspect of the present invention, a disc player is configured to detect an erroneous jumping movement of the information reading light spot from one track to another by using information in the information reading output of the pickup, and to gradually change the transfer function of at least one of the tracking servo loop and the focus servo loop every time such an erroneous jumping movement is detected.

DETAILED DESCRIPTION OF PREFERRED EMBODIMENTS

Figure 1:
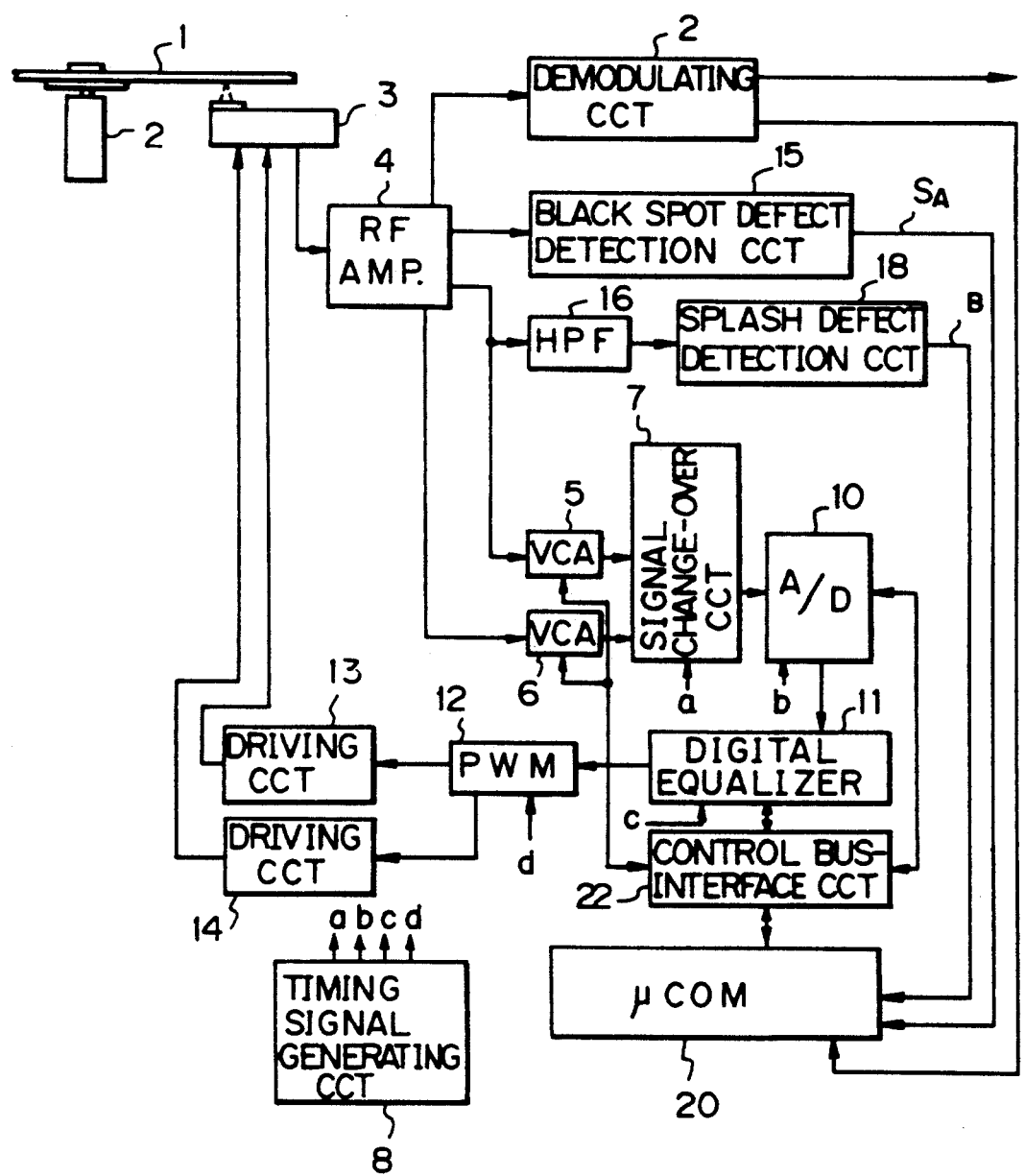
FIG. 1 is a block diagram of a first embodiment of the disc player according to the present invention.

In the FIG. 1, the disc 1 is rotated by a spindle motor 2. As the rotation of the disc 1, the signal recorded thereon is read-out by a pickup 3. The pickup 3 incorporates therein a laser diode, an objective lens, a focus actuator, a tracking actuator, and photo detectors, etc. An output signal from the photo detectors in the pickup 3 is supplied to an RF amplifier 4. The RF amplifier 4 is configured to amplify the RF (radio frequency) signal as an information reading signal, and to generate a tracking error signal according to the three-beam method, and a focus error signal according to the non-astigmatic method. The RF amplifier 4 is also operative to extract a low frequency component of the RF signal and to output the extracted low frequency component.

The tracking error signal and the focus error signal output from the RF amplifier 4 are supplied to a signal change-over circuit 7 through variable gain amplifiers 5 and 6 respectively. A change-over control signal a consisting of a square-wave signal of a predetermined frequency output from a timing signal generating circuit 8 is supplied to the signal change-over circuit 7. The signal change-over circuit 7 is configured to output the tracking error signal and the focus error signal alternately in response to this change-over control signal a. The output signal of the signal change-over circuit 7 is supplied to an A/D (analog to digital) converter circuit 10. A sampling pulse signal b synchronized in phase with the change-over control signal a is generated in the timing signal generating circuit 8 and supplied to the A/D converter circuit 10. In the A/D converter circuit 10, the tracking error signal and the focus error signal from the signal change-over circuit 7 are sampled alternately by using this sampling pulse signal b. The output data of the A/D converter circuit 10 is supplied to a digital equalizer 11 consisting of digital filters, etc. A timing pulse signal c synchronized with the sampling pulse signal b is generated in the timing signal generating circuit 8, and supplied to the digital equalizer 11. The digital equalizer 11 is configured to effect a phase compensation of the digitized tracking error signal and focus error signal which are alternately output from the A/D converter circuit 10, in a time-division fashion using the timing pulse signal c. The tracking error signal and the focus error signal treated by the phase compensation process in the digital equalizer 11 are alternately supplied to a PWM (pulse width modulation) circuit 12. The PWM circuit 12 is configured to generate two pulse signals having pulse widths respectively corresponding to the levels of the tracking error signal and the focus error signal using a timing pulse signal d from the timing signal generating circuit 8, synchronized with the timing pulse signal c. These two pulse signals output from the PWM circuit 12 are supplied to the tracking actuator and the focus actuator in the pickup 3 as drive signals, through a tracking actuator driving circuit 13 and a focus actuator driving circuit 14, respectively.

The low frequency component of the RF signal output from the RF amplifier 4 is supplied to a black spot defect detection circuit 15. The black spot defect detection circuit 15 comprises, for example, a slicing circuit, and is configured to generate a detection signal $S_A$ of a high level H or a low level L when the level of the low frequency component of the RF signal falls below a predetermined detection level $V_A$. The tracking error signal output from the RF amplifier 4 is also supplied to a splash defect detection circuit 18 through an HPF (high pass filter) circuit 16. The splash defect detection circuit 18 comprises, for example, a slicing circuit, and configured to output a detection signal $S_B$ of high level H or low level L when the level of the output signal of the HPF circuit 16 is equal to or higher than a predetermined detection level $V_B$. The detection signals output from the black spot defect detection circuit 15 and the splash defect detection circuit 18 are supplied to a microcomputer 20.

The RF signal output from the RF amplifier 4 is supplied to an EFM demodulation circuit 21. The EFM demodulation circuit 21 is configured to perform an EFM demodulation process of a pulse signal obtained by slicing the RF signal, to reproduce a PCM data, that is, a digital data including time-division multiplexed audio information of the left and right channels, and a subcode indicating the playing time, etc. The digital audio data including audio information output from the EFM demodulating circuit 21 is supplied to D/A converter circuit (not shown) after being treated by data processing operations such as the de-interleaving and error correction operations, to be converted to an analog audio signal. The subcode output from the EFM demodulating circuit 21 is supplied to the microcomputer 20. Various commands corresponding to key operations in an operational part (not shown) are also supplied to the microcomputer 20.

The microcomputer 20 includes a processor operated by programs previously stored in the ROM. By the operation of the processor, various command and data are supplied though a control-bus interface circuit 22 to the variable gain circuits 5 and 6, the A/D converter circuit 10 and the digital equalizer 11, etc., in response to the detection signals $S_A$ and $S_B$, and the subcode.

Figure 2A:
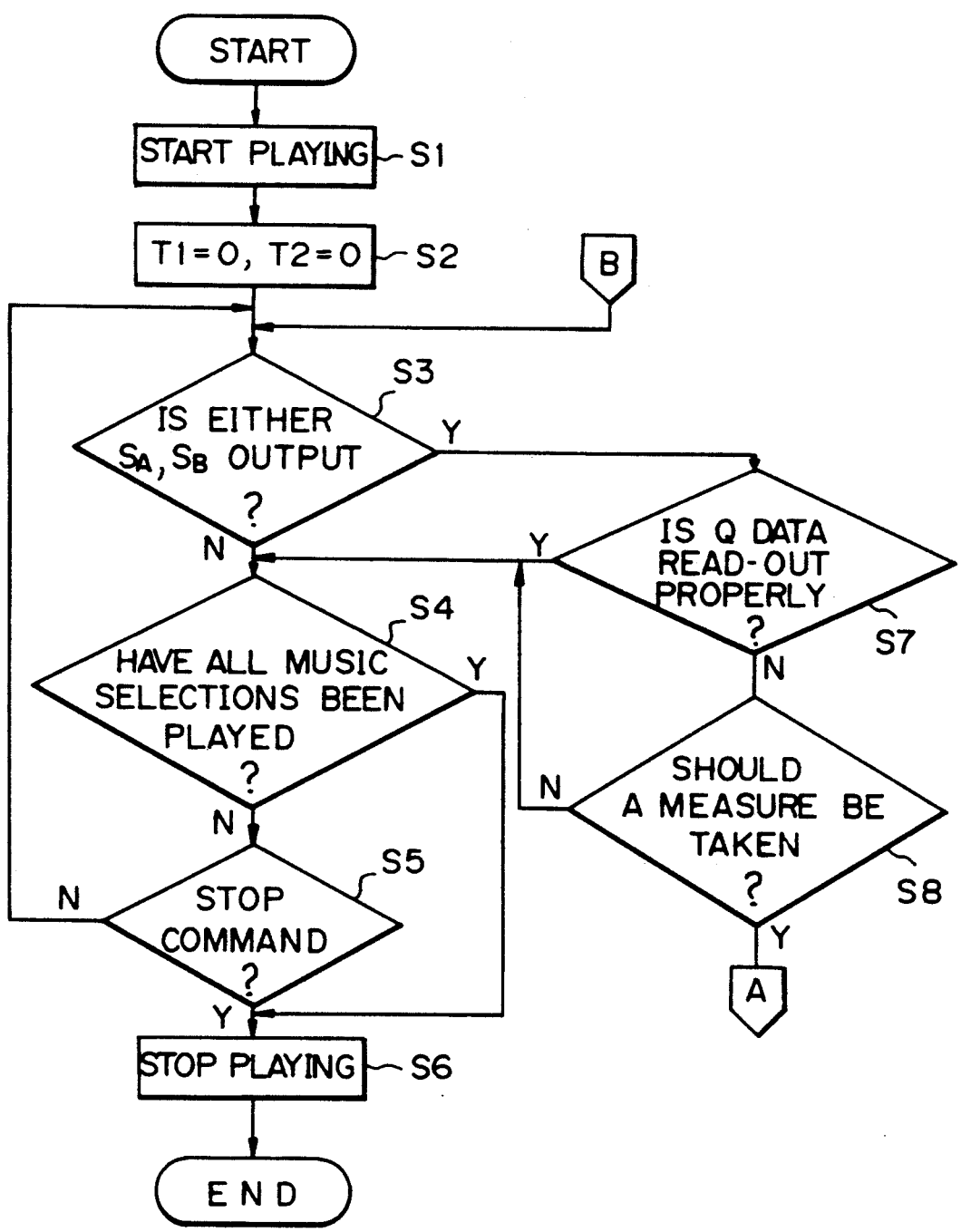
FIGS. 2A and 2B are flowcharts showing the operation of the processor in the player system shown in FIG. 1.
Figure 2B:
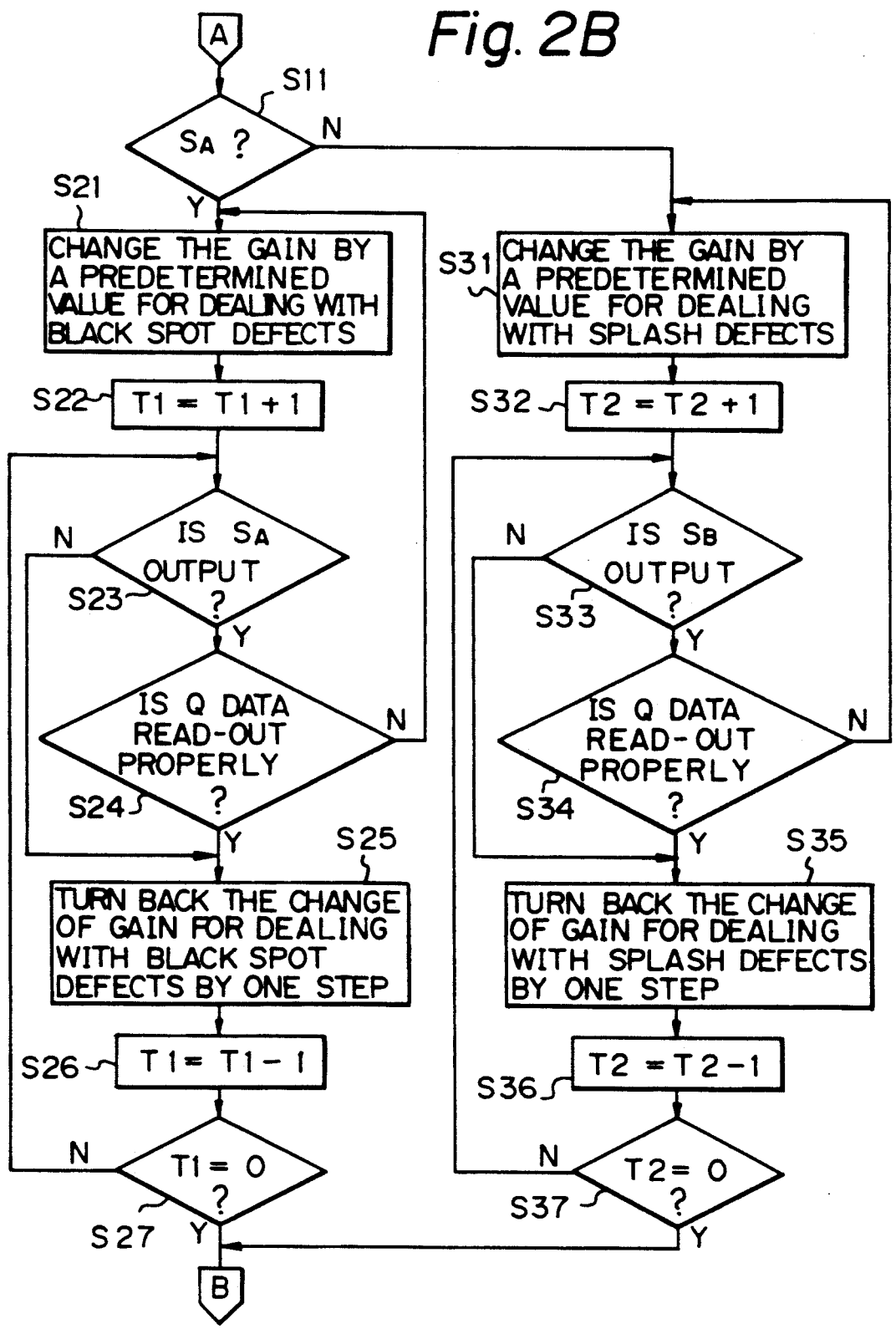

The operation of the processor of the microcomputer 20 in the arrangement described above will be explained with reference to the flowchart of FIGS. 2A and 2B of the accompanying drawings.

When a play command is issued during the execution of a main routine, the processor proceeds to step S1 in which the gain of the variable gain amplifiers 5 and 6, the dynamic range of the A/D converter circuit 10, and the characteristic of the digital equalizer, etc. are set respectively to initial values, and a play operation is started with various servo loops opened. Then, count value data T1 and T2 for detecting the number of the switching of the gain of the variable gain amplifiers 5 and 6 are set to zero and stored in predetermined addresses of the RAM by the processor (step S2). The processor then judges whether or not either of the detection signals $S_A$ and $S_B$ is output (step S3). If it is detected in step S3 that neither of the detection signals $S_A$ and $S_B$ is output, the processor in turn judges whether or not all music selections recorded on the disc 1 have been played, by using data of the Q channel in the subcode (step S4). If it is detected in step S4 that all music selections have not been played, processor then judges whether or not a stop command is issued (step S5). If it is judged that the stop command has been issued, the processor turns various servo loops off, and stops the play operation (step S6). If, conversely, it is judged that the stop command has not been issued, the processor proceeds to step S3 once more. If it is detected in step S4 that playback of all music selections has been completed, the processor proceeds to step S6 immediately.

If it is detected in step S3 that either of the detection signals $S_A$ and $S_B$ is output, the processor then judges whether or not the Q data of the subcode is read-out properly (step S7). If it is judged in step S7 that the Q data is read-out properly, the processor proceeds to step S4. If it is judged in step S7 that the Q data is not read-out properly, the processor then judges whether or not a measure against the track jumping fault is to be taken, by evaluating the highness of the frequency of occurrence of anomalous data in the Q data (step S8). If it is judged in step S8 that the measure against the track jumping fault should not be taken, the processor then proceeds to step S4. If it is judged in step S8 that the measure against the track jumping fault should be taken, the processor then judges whether or not the detection signal is output (step S11).

If it is detected in step S11 that the detection signal $S_A$ is output, the processor lowers the gain of the variable gain amplifier 6 by a predetermined amount, so as to reduce the possibility of occurrence of the track jumping fault by the black spot defect (step S21). With this operation, the characteristic of the digital equalizer may be also changed, so that the level only of the high frequency component of the error signal is reduced.

Then the processor adds a value 1 to the count value T1 (step S22), and judges whether or not the detection signal $S_A$ is output (step S23). If it is detected in step S23 that the detection signal $S_A$ is output, the processor judges whether or not the Q data is read-out properly (step S24). If it is judged in step S24 that the Q data is read-out properly, the processor turns back the gain of the variable gain amplifier, which has been changed by the predetermined amount in step S21, by the same amount of change for one processing cycle (step S25). If it is detected that the Q data is not read-out properly, the processor proceeds to step S21 once more. If it is detected in step S23 that the detection signal $S_A$ is not output, the processor immediately proceeds to step S25.

After executing the operation of step S25, the processor subtracts the value 1 from the count value 1 (step S26), and judges whether or not T1 is equal to zero (step S27). If it is detected in step S27 that T1 is not equal to zero, the processor proceeds to step S23, and conversely if it is detected that T1 is equal to zero, the processor proceeds to step S3 once more.

If it is detected in step S11 that the detection signal $S_A$ is not output, it follows that the detection signal $S_B$ is output. Then the processor lowers the gain of the variable gain amplifier 5 by a predetermined amount, so that the possibility of occurrence of the track jumping fault by the splash defect is reduced (step S31). With this operation, the characteristic of the digital equalizer 11 may also be varied so that the level only of the high frequency component of the error signal is reduced.

Then, the processor adds a value 1 to the count value T2 (step S32), and judges whether or not the detection signal $S_B$ is output (step S33). If it is detected in step S33 that the detection signal $S_B$ is output, the processor then judges whether or not the Q data is read-out properly (step S34). If it is judged that the Q data is read-out properly, the processor turns back the gain of the variable gain amplifier 5, which has been changed by the predetermined amount at step S31, by the same amount for one processing cycle (step S35). If it is judged that the Q data is not read-out properly, the processor proceeds to step S31 once more. Furthermore, if it is judged in step S33 that the detection signal $S_B$ is not output, the processor immediately proceeds to step S35.

After the execution of the step S35, the processor subtracts the value 1 from the count value T2 (step S36), and judges whether the count value T2 is equal to zero (step S37). If it is detected in step S37 that T2 is not equal to zero, the processor proceeds to step S33, and if T2 is judged to be equal to zero, the processor proceeds to step S3 once more.

By the steps S3, S7, S8 and S11 in the above procedure, the kind of defect in the disc is determined, and an appropriate measure is taken in accordance with the kind of defect determined. This point will be further explained.

Specifically, when the information reading light spot of the pickup traces a portion of the disc where a black spot defect exists, the amount of the light reflected by the disc 1 is reduced, so that the level of the low frequency component of the RF signal is reduced accordingly. In this state, the detection signal $S_A$ is output from the black spot defect detection circuit 15. As a result, the loop gain of the focus servo loop, for example, is gradually reduced by the operations of steps S21 through S24 until the Q data is read-out properly. In this state, if noises are generated in the focus error signal by the black spot defect, adverse effects of the noises on the beams provided for the tracking servo control operation are maintained small since the influence of the noises on the focus servo control is small under this condition. Thus, the track jumping fault by the black spot defect is prevented. Subsequently, when the information reading light spot of the pickup reaches an area without defects, the loop gain of the focus servo loop is reduced to the former value by the operations of steps S25 through S27.

When the information reading light spot of the pickup 3 traces a portion of the disc 1 where a splash defect exists, pulse-like noises will be generated in the tracking error signal, and the detection signal $S_B$ is output from the splash defect detection circuit 18. As a result, the loop gain of the tracking servo loop for example is gradually reduced by the operations of the steps S31 through S34 until the Q data is read-out properly. In this state, if the pulse-like noises are generated in the tracking error signal by the splash defect, their influences on the tracking servo control operation are maintained small. Thus, the track jumping fault by the splash defect is prevented. Subsequently, when the information reading light spot of the pickup reaches the area without defects, the loop gain of the tracking servo loop is reduced to the former value by the operations of the steps S35 through S37.

As described in the foregoing, the first embodiment of the disc player according to the present invention is configured that the first fault detection signal is generated when the instantaneous level of the low frequency component of the reading signal output from the pickup has dropped below the first predetermined level, and the second fault detection signal is generated when the instantaneous level of the high frequency component of the error signal of the tracking servo loop has risen above the second predetermined level. In response to each of the first and second defect detection signals, the transfer function of at least one of the tracking servo loop and focus servo loop is adjusted. Therefore, it is possible to prevent easily the faults by different kinds of disc's defects, such as the black spot defect and the splash defect, which will cause effects on portions of the player different from each other.

The second embodiment of the disc player according to the present invention will be described hereinafter.

Figure 3:
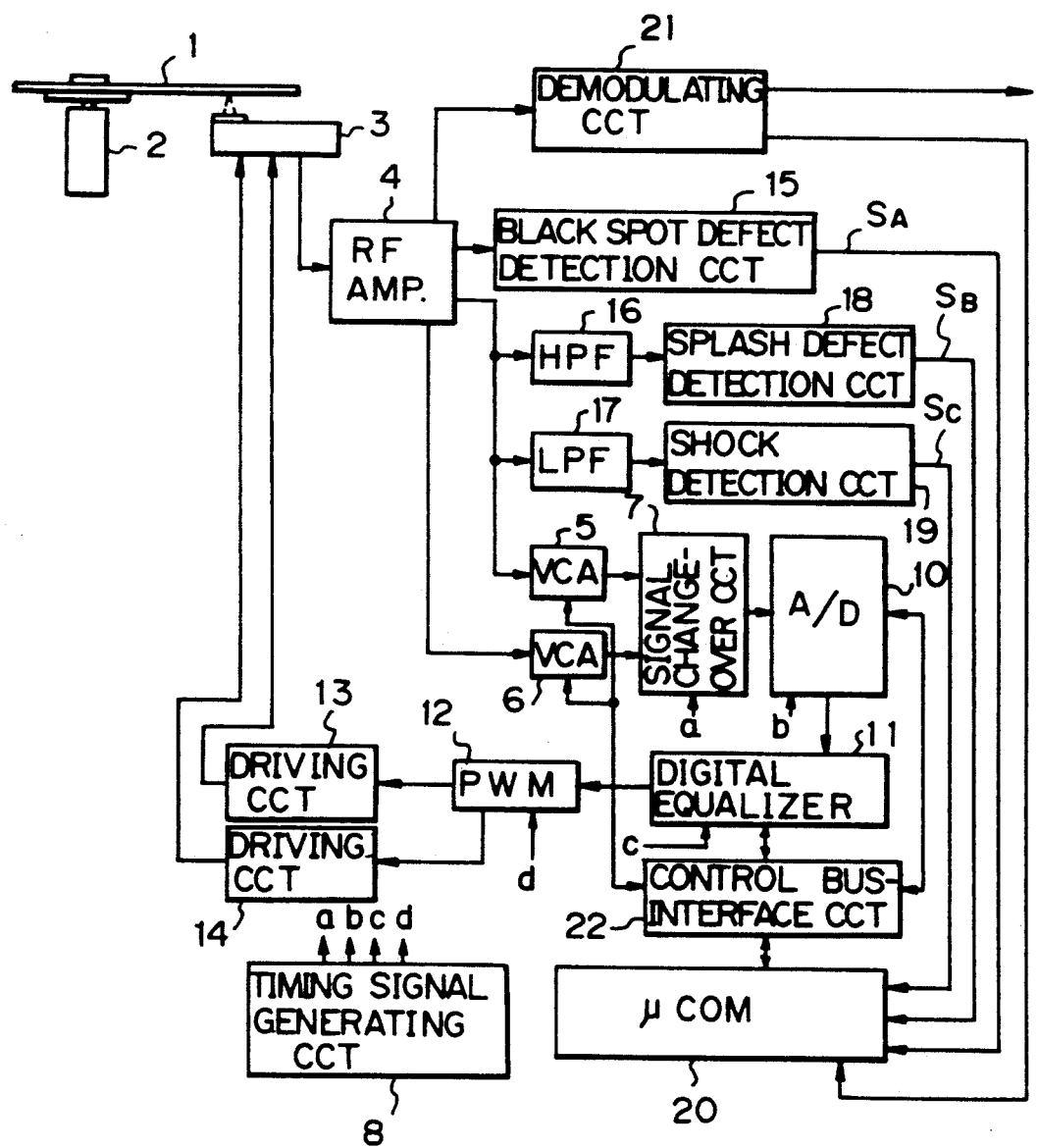
FIG. 3 is a block diagram of a second embodiment the disc player according to the present invention.

The structure of the second embodiment of the disc player according to the present invention is illustrated in FIG. 3. Besides the circuit elements already shown in FIG. 1, the disc player includes a shock detection circuit 19 which receives the tracking error signal output from the RF amplifier 4 through an LPF (low pass filter) 17. As the splash defect detection circuit 18, the shock detection circuit 19 comprises a slicing circuit, and is constructed to produces a detection signal $S_C$ of An H level Or an L level when the output level of the LPF circuit 17 is equal to or higher than a predetermined level Vc. The output signal of the shock detection circuit 19 is supplied to the microcomputer 20.

Since the other circuit elements in this embodiment are the same as the embodiment shown in FIG. 1, the explanation thereof will not be repeated.

Figure 4A:
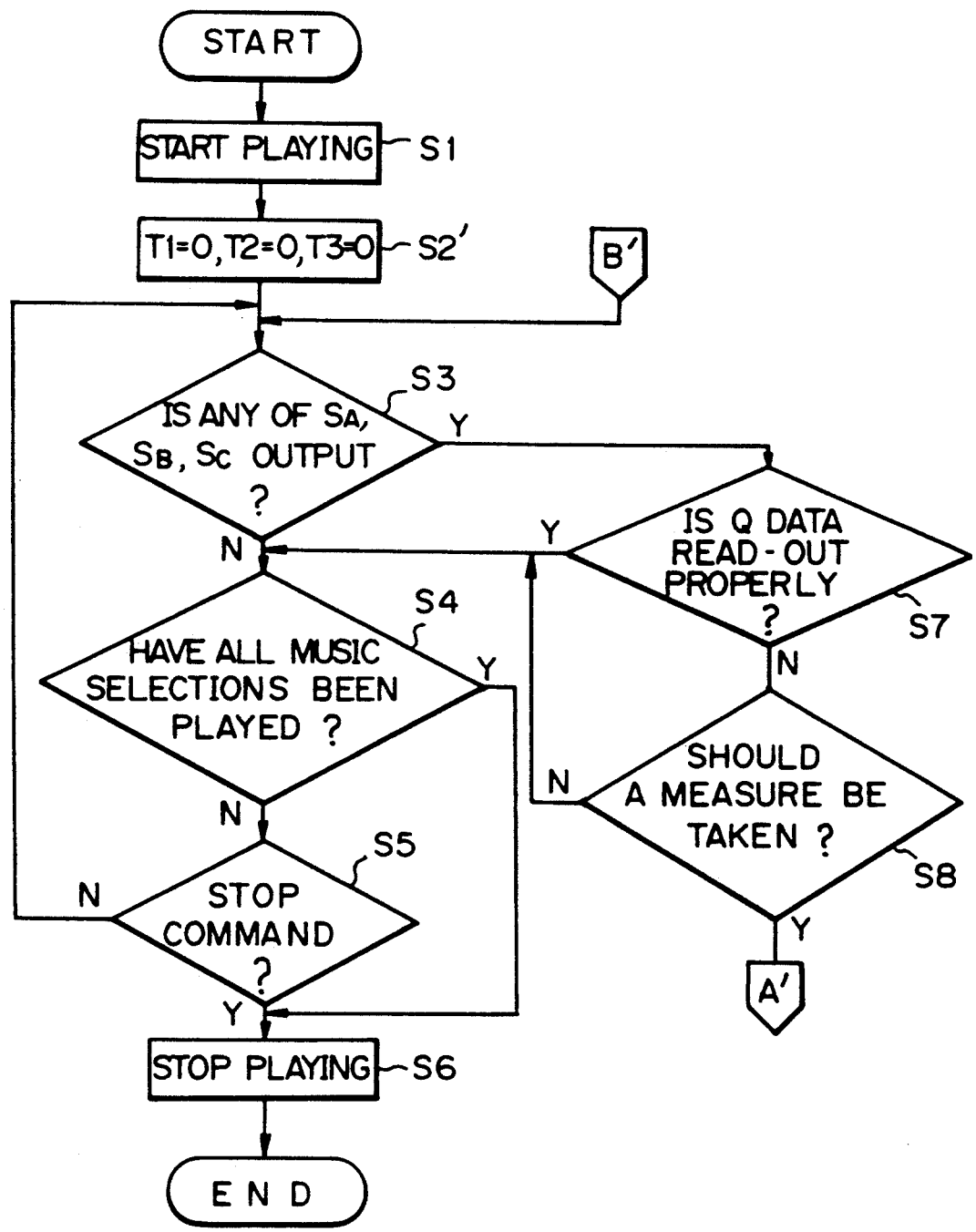
FIGS. 4A–4B are flowcharts showing the operation of the processor in the player system shown in FIG. 3.
Figures 2, 4B:
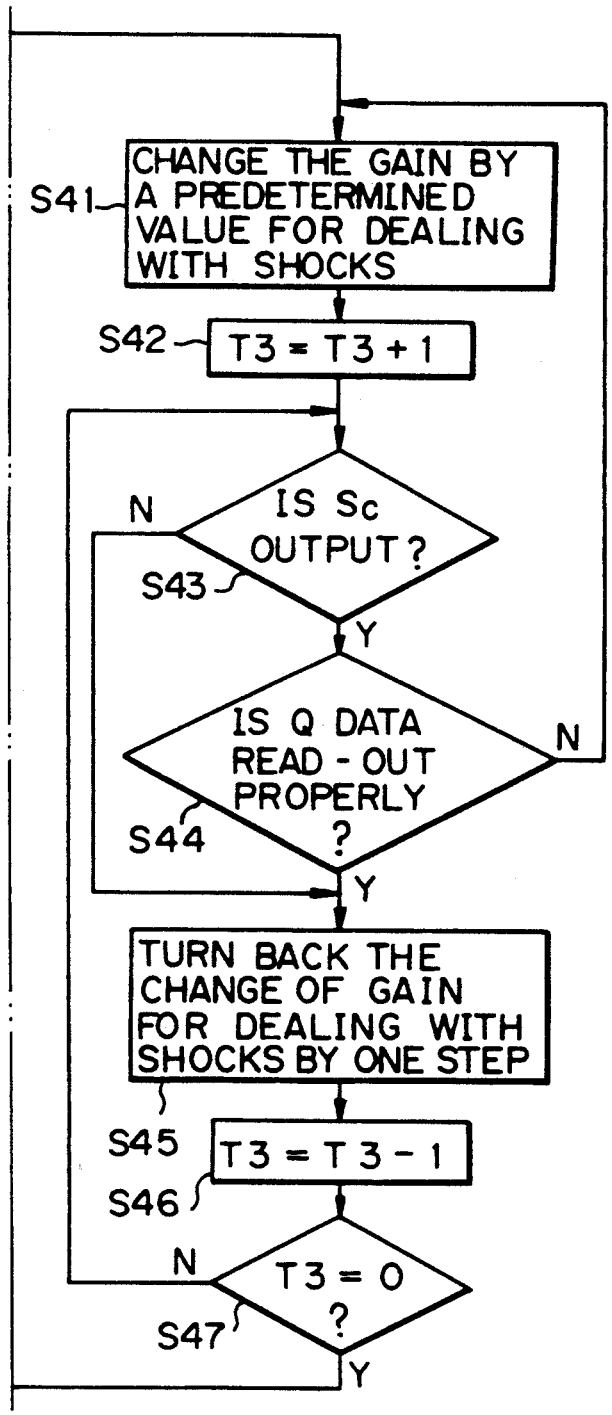

Then the operation of the disc player shown in FIG. 3 will be explained with reference to the flowcharts of FIGS. 4A and 4B. As shown in the flowchart of FIG. 4A the processor proceeds to step S1, when a play command is issued during the execution of the main routine, in which step the gain of the variable gain amplifiers 5 and 6, the dynamic range of the A/D converter circuit 10, and the characteristic of the digital equalizer, etc. are set respectively to initial values, and a play operation is started with various servo loops opened. Then, count value data T1, T2 and T3 for detecting the number of switching of the gain of the variable gain amplifiers 5 and 6 are set to zero and stored in predetermined addresses of the RAM by the processor (step S2'). The processor then judges whether or not any of the detection signals $S_A$, $S_B$, and $S_C$ is output (step S3'). The following steps S4 through S8 are the same as those already explained with reference to FIG. 2A, and the explanation thereof will not be repeated. When it is determined in step S8 that a measure against the track jumping fault should be taken, the processor process to steps S11' and S12 shown in FIG. 4B. In these steps, a check is made successively to determine whether or not the detection signal $S_A$ is output and whether or not the detection signal $S_B$ is output. If it is judged in step S11' that the detection signal $S_A$ is output, the processor proceeds to step S21. Since the operation of the steps S21 through S27 are the same as those in the previous embodiment, the explanation thereof will no be repeated in this description.

If it is judged in step S12 that the detection signal $S_B$ is output, the processor proceeds to step S31. Since the operation of the steps S31 through S37 are the same as those in the previous embodiment, the explanation thereof will not be repeated.

If it is determined in step S12 that the detection signal $S_B$ is not output, then the processor judges that the detection signal $S_C$ is output, and proceeds to step S41. In step S41, the processor increases the gain of the variable gain amplifiers 5 and 6 by predetermined values, so that the track jumping fault will not be caused easily by external shocks or vibrations. Instead of the operation described above, it is also possible to change the characteristic of the digital equalizer 11 so that only the low frequency component of the error signal is emphasized.

Then, the processor adds a value 1 to the count value T3 (step S42), and judges whether or not the detection signal $S_C$ is output (step S43). If it is judged in step S43 that the detection signal $S_C$ is output, the processor judges whether or not the Q data is read-out properly (step S44). If it is judged that the Q data is read-out properly, the processor turns back the gains of the variable gain amplifiers 5 and 6 which have been changed by the predetermined values in step S41, by the same amounts for one processing cycle (step S45). If it is determined that the Q data is not read-out properly, the processor proceeds to step S41 once more. Further, if it is determined in step S43 that the detection signal $S_C$ is not output, the processor immediately proceeds to step S45.

After the execution of the step S45, the processor subtracts the value 1 from the count value T3 (step S46), and judges whether or not the count value T3 is equal to zero (step S47). If it is determined in step S47 that the count value T3 is not equal to zero, the processor proceeds to step S43. If it is determined that T3 is equal to zero, the processor proceeds to step S3 once more.

In the above-described operation, kind of the disc defect is determined by the operations of steps S11' and S12, and an appropriate measure is taken depending on the kind of disc's defect.

When vibrations are applied to the disc player from outside, the relative position between the disc 1 and the objective lens in the pickup 3 is changed by the vibrations, and which in turn will generate a level change in the tracking error signal. As a result of this level change in the tracking error signal, the detection signal $S_C$ is generated when the instantaneous level of the low frequency component of the tracking error signal has exceeded the predetermined level Vc. In this event, the operations in steps S41 through S44 are executed, so that the loop gains of the tracking servo loop and the focus servo loop, for example, are gradually increased until the Q data is read-out properly. Thus, the responsiveness of the disc player against the change in the relative position caused by external vibrations is improved, so that the generation of track jumping fault is prevented. When the external vibrations disappear subsequently, the loop gains of the tracking servo loop and the focus servo loop are turned back through the operations of steps S45 through S47.

As specifically describe above, in the second embodiment of the disc player according to the present invention, the transfer function of at least one of the tracking servo loop and the focus servo loop is gradually changed each time an erroneous jumping movement of the information reading light spot towards other track is detected by the information contained in the output read-out signal of the pickup. Therefore, when the measure is taken for preventing the fault by the disc's defects, the loop gain of each servo loop will not be reduced excessively to render the disc player susceptible to external vibrations causing faults. Similarly, when the measure is taken to prevent the fault by external vibrations, the loop gain of each servo loop will not be increased excessively to render the disc player susceptible to the disc's defects causing faults. In this way, the fault by disc's defects and the fault by external vibrations are easily prevented according to the present invention.

What is claimed is:

1. A disc playing apparatus for playing a disc comprising:

a focus servo loop for irradiating and focusing a light beam, which is issued from a pickup means and irradiated on a recording surface of said disc, to form an information reading light spot on said recording surface;

pickup means including photodetector means responsive to said information reading light spot for reading a signal recorded on said disc and outputting an information read signal corresponding to said recorded information;

a tracking servo loop for moving said information reading light spot to follow a recording track of said disc;

a first disc defect detection means for generating a first fault detection signal when an instantaneous level of a low frequency component of said read signal falls below a first predetermined value;

a second disc defect detection means for generating a second fault detection signal when an instantaneous level of a high frequency component of an error signal of said tracking servo loop rises above a second predetermined value; and adjusting means for adjusting a transfer function of at least one of said focus servo loop and said tracking servo loop in response respectively to said first and second fault detection signals.

2. A disc playing apparatus for playing a disc comprising:

a focus servo loop for focusing a light beam on a recording surface of said disc, to form an information reading light spot on said recording surface;

pickup means including a photodetector responsive to said information reading light spot for reading a signal recorded on said disc;

a tracking servo loop for moving said information reading light spot to follow a recording track of said disc; and control means for detecting an erroneous track jumping movement of said information reading light spot by using information contained in a read signal output by said pickup means and gradually changing a transfer function of at least one of said tracking servo loop and said focus servo loop each time said erroneous jumping movement is detected;

means for generating a shock detection signal in response to said erroneous jumping movement caused by an external vibration;

a first counter containing a first count;

means responsive to said shock detection signal, for changing a loop gain of at least one of said focus servo loop and said tracking servo loop by a first predetermined amount each processing cycle of said control means, and for increasing said first count by one; and means responsive to lack of said shock detection signal, when said first count is greater than zero, for changing back the loop gain of at least one of said focus servo loop and said tracking servo loop by said first predetermined amount, each processing cycle of said control means, and for reducing said first count by one.

3. A disc playing apparatus as claimed in claim 2, wherein said control means further comprises:

means for generating a disc defect detection signal in response to said erroneous jumping movement caused by a disc defect;

a second counter containing a second count;

means responsive to said disc defect detection signal, for changing the loop gain of at least one of said focus servo loop and said tracking servo loop, a second predetermined amount each processing cycle of said control means, and for increasing said second count by one; and means responsive to lack of said disc defect detection signal, when said second count is greater than zero, for changing back the loop gain of at least one of said focus servo loop nd said tracking servo loop by said second predetermined amount each processing cycle of said control means, and for reducing said second count by one.

4. A disc playing apparatus for playing a disc comprising:

a focus servo loop for focusing a light beam on a recording surface of said disc, to form an information reading light spot on said recording surface;

pickup means including a photodetector responsive to said information reading light spot for reading a signal recorded on said disc;

a tracking servo loop for moving said information reading light spot to follow a recording track of said disc; and control means for detecting an erroneous track jumping movement of said information reading light spot by using information contained in a read signal output by said pickup means and gradually changing a transfer function of at least one of said tracking servo loop and said focus servo loop each time said erroneous jumping movement is detected;

means for generating a shock detection signal in response to said erroneous jumping movement caused by an external vibration;

a counter containing a count;

means responsive to said shock detection signal, for changing a loop gain of at least one of said focus servo loop and said tracking servo loop by a predetermined amount each processing cycle of said control means, and for increasing said count by one; and means responsive to lack of said shock detection signal, when said first count is greater than zero, for changing back the loop gain of at least one of said focus servo loop or said tracking servo loop by said predetermined amount, each processing cycle of said control means, and for reducing said count by one.

5. A disc playing apparatus for playing a disc comprising:

a focus servo loop for focusing a light beam on a recording surface of said disc, to form an information reading light spot on said recording surface;

pickup means including a photodetector responsive to said information reading light spot for reading a signal recorded on said disc;

a tracking servo loop for moving said information reading light spot to follow a recording track of said disc; and control means for detecting an erroneous track jumping movement of said information reading light spot by using information contained in a read signal output by said pickup means and gradually changing a transfer function of at least one of said tracking servo loop and said focus servo loop each time said erroneous jumping movement is detected;

means for generating a disc defect detection signal in response to said erroneous jumping movement caused by a disc defect;

a counter containing a count;

means responsive to said disc defect detection signal, for changing the loop gain of at least one of said focus servo loop and said tracking servo loop, a predetermined amount each processing cycle of said control means, and for increasing said count by one; and means responsive to lack of said disc defect detection signal, when said count is greater than zero, for changing back the loop gain of at least one of said focus servo loop and said tracking servo loop by said predetermined amount each processing cycle of said control means, and for reducing said count by one.

* * * * *